United States Patent
Maiwald

(10) Patent No.: US 8,863,941 B2
(45) Date of Patent: Oct. 21, 2014

(54) DEVICE FOR REGULATING THE LINEAR STABILITY OF A BELT

(75) Inventor: Andreas Maiwald, Heiligenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 150 days.

(21) Appl. No.: 13/580,419

(22) PCT Filed: Dec. 30, 2010

(86) PCT No.: PCT/EP2010/070918
§ 371 (c)(1),
(2), (4) Date: Dec. 13, 2012

(87) PCT Pub. No.: WO2011/101068
PCT Pub. Date: Aug. 28, 2011

(65) Prior Publication Data
US 2013/0075235 A1    Mar. 28, 2013

(30) Foreign Application Priority Data

Feb. 22, 2010 (DE) .......................... 10 2010 002 172

(51) Int. Cl.
*B65H 23/00* (2006.01)
*B65G 15/60* (2006.01)
*B65G 39/16* (2006.01)

(52) U.S. Cl.
CPC ................ *B65G 15/60* (2013.01); *B65G 39/16* (2013.01)
USPC .......................................... 198/806; 198/807

(58) Field of Classification Search
None
See application file for complete search history.

(56) References Cited

U.S. PATENT DOCUMENTS

| 3,429,416 | A | 2/1969 | Provost et al. |
| 5,287,952 | A | 2/1994 | Redaelli |
| 6,672,450 | B2 | 1/2004 | Horne |
| 6,910,571 | B1 | 6/2005 | Ertel |
| 7,882,946 | B2* | 2/2011 | Hein et al. ................... 198/807 |
| 8,656,832 | B2* | 2/2014 | Marques et al. ............... 100/88 |
| 2001/0011690 | A1 | 8/2001 | Luyckx et al. |
| 2011/0127145 | A1 | 6/2011 | Eriksson |

FOREIGN PATENT DOCUMENTS

| DE | 1057016 | 5/1959 |
| DE | 19755965 | 6/1998 |
| EP | 0659663 | 6/1995 |
| EP | 1279629 | 1/2003 |
| EP | 2045206 | 4/2009 |
| JP | 11011626 | 1/1991 |
| JP | 10338325 | 12/1998 |
| JP | 11139524 | 5/1999 |

OTHER PUBLICATIONS

PCT/EP2010/070918 International Search Report dated Apr. 13, 2011 (English Translation and Original, 4 pages).

* cited by examiner

*Primary Examiner* — Kavel Singh
(74) *Attorney, Agent, or Firm* — Michael Best & Friedrich LLP

(57) ABSTRACT

In a device for regulating the linear stability of a revolving belt (10) of a conveying system, a control roller (20) disposed transversely with respect to a belt running direction is pressed against the belt. The control roller (20) can be displaced by means of an actuator co-operating with a sensor detecting the lateral position of the belt (10) in order to displace the control roller (20) to align the belt if the belt (10) drifts laterally. The control roller (20) is mounted on an axle (21) which in the region of a first edge of the belt is pivotably mounted and in the region of a second edge of the belt is connected and movably guided at the second end thereof using guiding and adjusting means. The control roller (20) is disposed with a high degree of looping on the inner face of the belt in a belt loop (22) located substantially perpendicular to a conveying plane and can be pivoted substantially perpendicularly to the conveying plane.

13 Claims, 2 Drawing Sheets

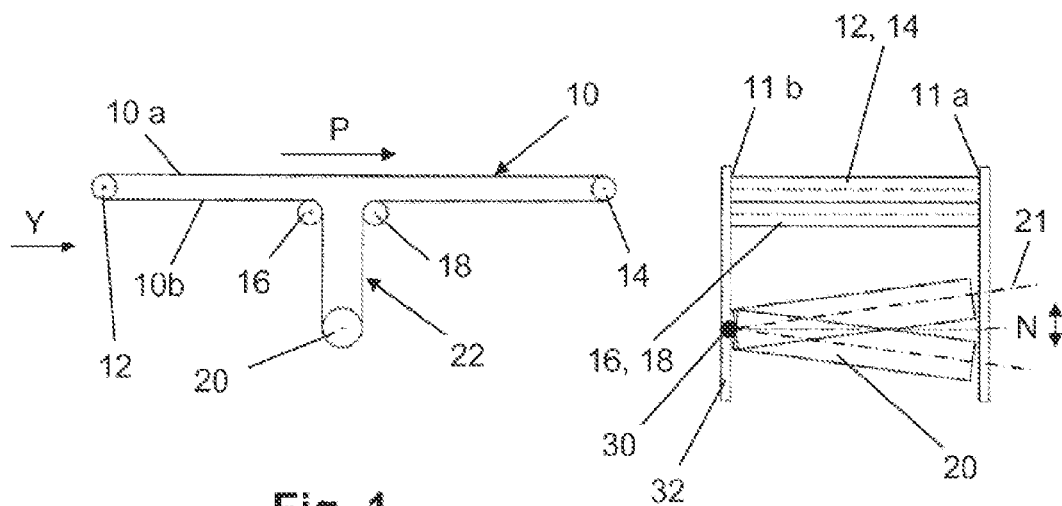
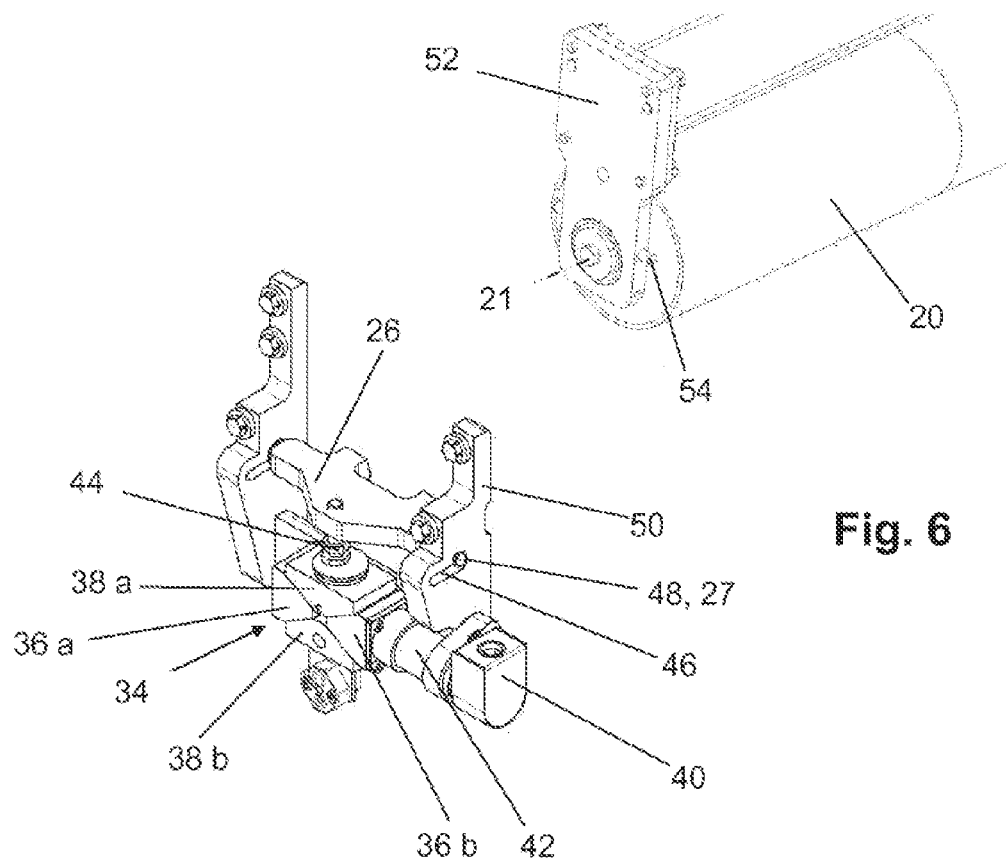

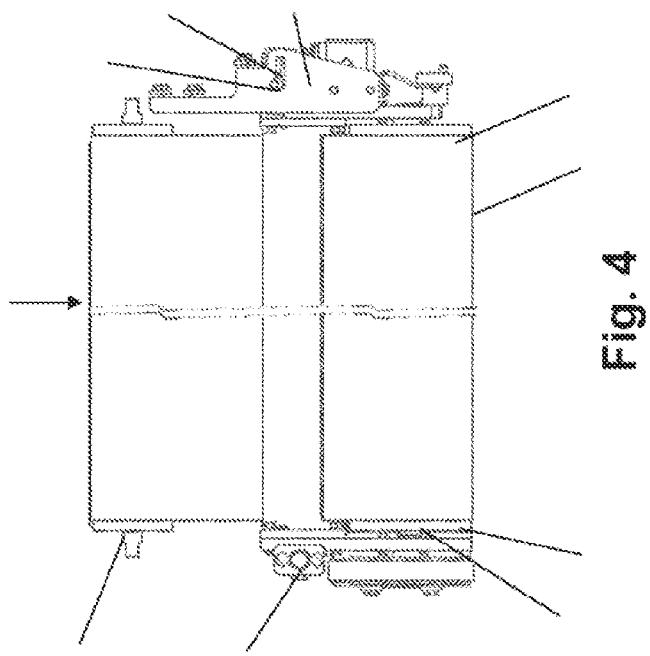
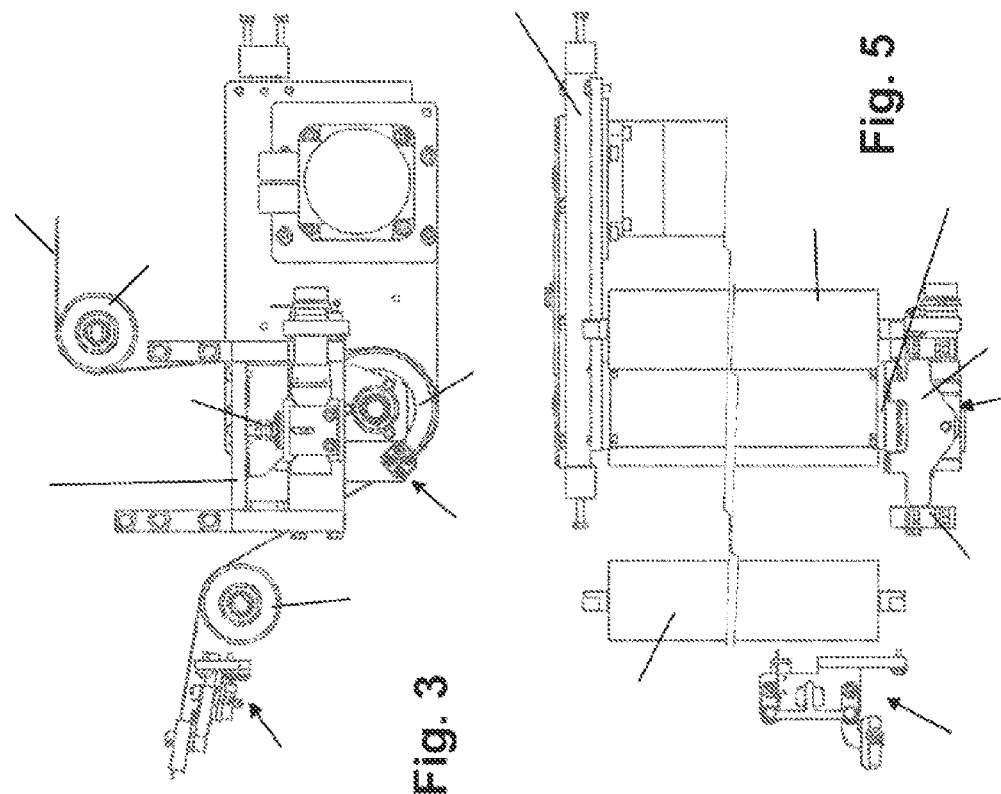

DEVICE FOR REGULATING THE LINEAR STABILITY OF A BELT

TECHNICAL FIELD

The present invention relates to a device for regulating the linear stability of a revolving belt of a transport installation by means of a control roller which is arranged transversely to a belt running direction and is pressed against the belt and which can be deflected by means of an actuating drive cooperating with a sensor detecting the lateral position of the belt, in order, in the event of a lateral drift of the belt, to deflect the control roller for the purpose of aligning the belt, the control roller being mounted on an axle which is mounted pivotably in the region of a first edge of the belt and which is connected and displaceably guided at its second end in the region of the second edge of the belt by guidance and adjustment means.

BACKGROUND OF THE INVENTION

Transport installations with revolving belts are used, for example, as what are known as "discharge stations" and are described inter alia in U.S. Pat. No. 3,429,416 and EP-A-558 123. The purpose of these installations is to distribute a product stream having a multiplicity of products, for example chocolate bars or biscuits which are mostly delivered directly from a production process, to a plurality of packaging machines.

In this case, the products are transferred from a main transport stream, in which they are moved, arranged in rows, by means of movable belt sections onto the individual feed devices, mostly arranged transversely to the main transport stream, of the individual packaging machines. A multiplicity of arrangements are known here, depending on the specific requirements, such as the demand for space, installation speed, product properties and operator friendliness and accessibility for cleaning and maintenance.

The broad belts used tend to run "obliquely", and therefore a special device is needed to ensure the linear stability of the belts. Such a device of the type initially mentioned for a discharge station is known from EP-A-0 659 663. In this case, a pressure roller is arranged below the main transport belt. The pressure roller, which has a low loop-around, can be moved forward and backward on one side for the purpose of passive belt control. The belt is steered in a desired direction as a result of this movement.

The belt control known from EP-A-0 659 663 has the disadvantage that the control roller has only a low loop-around. Only limited influence upon the belt run is therefore possible. Moreover, the control roller acts upon the belt outside which, with progressive contamination, mostly allows ever lower friction or force transmission, and therefore the controllability of the belt is further impaired. Also, only reaching the two extreme positions of the belt edges is monitored by the sensor technology, and this is then reversed in each case, so as to give rise to a belt run which swings to and fro constantly between the two extreme positions. A further disadvantage arises in that the belt rollers are connected fixedly to the frame of the station. For this reason, to change a belt, the belt has to be cut open and the new belt has to be welded to the installation. Should an endless belt be changed directly, in this installation all the rollers around which the belt is looped have to be demounted.

SUMMARY OF THE INVENTION

The object on which the invention is based is to provide a device which ensures the linear stability of a belt in a transport installation, in particular in a discharge station, and which does not have the abovementioned disadvantages. In particular, instead of control between limit values, regulation around a desired value should be possible, in order thereby to minimize the swinging movement of the belt. The looping of the belt around the control roller should be as high as possible in order to ensure as strong an influence upon the belt run as possible. Control should take place from the belt inside which usually has higher and, above all, uniform friction, since this inside is not subjected to contamination by transported products.

Also, a simple change of the belt should be possible, without the latter having to be cut open and the new belt welded to the installation.

In a device of the type initially mentioned, the object is achieved, according to the invention, in that the control roller is arranged on the inside of the belt in a belt loop lying essentially perpendicularly to a transport plane and having high loop-around and is pivotable essentially perpendicularly to the transport plane. The belt running around the belt loop deviates preferably by no more than ±20° from the perpendicular to the transport plane. The same also applies to the pivoting plane of the control roller.

The control roller preferably serves at the same time as a drive roller and is mounted on one side on a preferably electrically height-adjustable rocker.

The height of the rocker can expediently be adjusted via a gear, preferably via a spline gear.

To demount the control roller, the rocker can be displaced away from the control roller preferably in the axial direction of the latter. For this purpose, the rocker is expediently mounted laterally in each case in a long hole of lateral mountings.

For detecting the position of the belt and the location of the control roller for regulation about a position or location desired value of the belt and of the control roller, a regulating device with sensors is provided.

The loop-around of the control roller preferably amounts to 90 to 210°, preferably 150 to 180°.

BRIEF DESCRIPTION OF THE DRAWINGS

Further advantages, features and details of the invention may be gathered from the following description of preferred exemplary embodiments and from the drawing which serves merely for explanatory purposes and is not to be interpreted restrictively. In the diagrammatic drawing:

FIG. 1 shows a side view of a belt run in a device according to the invention;

FIG. 2 shows a view of the belt run of FIG. 1 in the viewing direction Y;

FIG. 3 shows a side view of a device according to the invention;

FIG. 4 shows the front view of the device of FIG. 3;

FIG. 5 shows the view of the device of FIG. 4 in the viewing direction Y;

FIG. 6 shows an oblique view of a detail of FIG. 5 with rocker and unlocked drive and control roller in an enlarged illustration.

DETAILED DESCRIPTION

FIG. 1 shows an endless transport belt 10 with a horizontally running transport strand 10A and return strand 10B which are arranged between a first and a second deflecting roller 12, 14. The return strand 10B is shaped via a third and a fourth deflecting roller 16, 18 into a belt loop 22 projecting essentially perpendicularly from the horizontal plane of the transport strand 10A and looping around a drive and control roller 20. The belt 10 runs as a transport strand 10A in the direction of the arrow P. The belt 10 is, for example, 1.5 m wide and has two belt edges 11 running parallel to one another. In order to regulate the linear stability of the belt 10, the axle 21 of the drive and control roller 20 can be pivoted up and down about its normal horizontal location N. For this purpose, the drive and control roller 20 is articulated at one end on a machine frame 32 via a pivot bearing 30. The other end can be raised and lowered via a lifting mechanism described in more detail further below, thus leading to a temporary oblique position of the drive and control roller 20 with respect to a normal location defined perpendicularly to the belt running direction (FIG. 2).

FIGS. 3 to 5 illustrate the mounting of the drive and control roller 20 and the arrangement of distance sensors for belt regulation. A first distance sensor 24 serves for the absolute detection of the belt position, that is to say the lateral deviation of a belt edge 11 from a normal position. The belt position is detected, for example, with the aid of an inductive displacement measuring sensor and is compared with the desired value corresponding to the normal position, so that a manipulated variable for the deflection of the drive and control roller 20 out of its normal horizontal location N can be generated. In this case, the drive and control roller 20 is mounted on a height-adjustable rocker 26, so that its axle 21 can be moved up and down on one side about a horizontal location. By means of a second, optional distance sensor 28, the location of the drive and control roller 20 is detected absolutely, so that genuine regulation of the belt 10 about a location desired value can take place. Instead of the distance sensor 28, for example, a motor with absolute feedback may also be used.

The looping around the drive and control roller 20 by the belt is virtually 180 degrees, so that it is possible to influence the belt run very effectively.

As is clear from FIG. 6, the height adjustment of the rocker 26 takes place via a spline gear 34. The spline gear 34 is composed of two mutually opposite horizontal splines 36a, 36b and two mutually opposite vertical splines 38a, 38b, the spline tips pointing toward a common center and the spline faces of the horizontal splines 36a, 36b lying slideably displaceably on the spline faces of the adjacent vertical splines 38a, 38b. To regulate the linear stability of the belt 10, the axle of the drive and control roller 20 has to be pivoted counter to the high tension forces of the belt. The spline gear 34 used in the example illustrated is highly suitable for this purpose. In this case, the horizontal splines 36a, 36b are moved toward one another or apart from one another by means of a drive 40 and a gear flange 42 with an internal spindle, with the result that the upper vertical spline 38a is raised or lowered. The necessary torque for adjustment can be applied without difficultly, for example, via a conventional compact DC servomotor with high gear step-up, for example by means of an epicyclic gear. The transmission of force from the upper vertical spline 38a to the rocker 26 takes place via an intermediate lifting rod 44. The rocker 26 is guided in long holes 46 of lateral mountings 50 via laterally projecting guide journals 27. When the rocker 26 is in the locked position, the guide journals 27 rest in a latching position 48 of each long hole 46. The axle 21 of the drive and control roller 20 is mounted on the side of the rocker 26 in a holder plate 52. Two supporting journals 54 for lying on the rocker 26 project laterally from the holder plate 52. The rocker 26 can be unlocked from the latching position 48 in the long holes 46 by the displacement of the guide journals 27 and can be removed from the holder plate 52 by means of the supporting journals 54 projecting laterally from the latter for the purpose of resting on the rocker 26. The drive and control roller 20 can thus be pivoted upwards, so that the belt 10 can be extracted non-destructively. The further rollers, such as the deflecting rollers 16, 18, may, for example, be mounted in upwardly open grooves such that they can be extracted upwardly in a simple way. Alternatively, the further rollers may likewise be attached so as to be pivotable upwardly. The belt can consequently be drawn off from the rollers, without having to be cut open, and a new already closed endless belt can be pushed on.

The essential advantages of the device according to the invention are:

The belt run can be regulated with very high quality via the control and drive roller owing to the high loop-around and very good traction of the latter.

Contamination of the belt, for example by products, has little influence upon belt regulation, since the control and drive roller contacts the inside of the belt.

Simple and cost-effective set-up—no separate control roller needed for belt regulation, the existing drive roller being utilized.

Absolute detection of the belt position makes it possible to have genuine regulation about a desired value and consequently an only slight swinging movement of the belt.

By the rocker being unlocked, the control and drive roller can be pivoted upward by means of the same joint which is used for belt regulation, and therefore the endless belt can be extracted and replaced without being cut open and welded respectively.

What is claimed is:

1. A device for regulating the linear stability of a revolving belt (10) of a transport installation including a control roller (20) which is arranged transversely to a belt running direction and is pressed against the belt (10) and which can be deflected by means of an actuating drive cooperating with a sensor (24) detecting a lateral position of the belt (10), in order, in the event of a lateral drift of the belt (10), to deflect the control roller (20) for the purpose of aligning the belt, the control roller (20) being mounted on an axle (21) which is mounted pivotably in the region of a first edge (11a) of the belt (10) and which is connected and displaceably guided at its second end in the region of a second edge (lib) of the belt (10) by guidance and adjustment means, characterized in that the control roller (20) is arranged on the inside of the belt (10) in a belt loop (22) lying essentially perpendicularly to a transport plane and having high loop-around and is pivotable essentially perpendicularly to the transport plane, characterized in that the control roller (20) is mounted on one side on an electrically height-adjustable rocker (26), and characterized in that to demount the belt (10) the rocker (26) is displaced away from the control roller (20) in an axial direction of the latter, and the control roller (20) is consequently pivoted away.

2. The device as claimed in claim 1, characterized in that the control roller (20) serves at the same time as a drive roller.

3. The device as claimed in claim 1, characterized in that the height of the rocker (26) is adjusted via a gear (34).

4. The device as claimed in claim 1, characterized in that the rocker (26) is mounted laterally in a long hole (46) of lateral mountings (50).

5. The device as claimed in claim 1, characterized in that a regulating device with sensors (24, 28) is provided for detecting the position of the belt (10) and the location of the control roller (20) for regulation about a position or location desired value of the belt (10) and of the control roller (20).

6. The device as claimed in claim 1, characterized in that the loop-around of the control roller (20) amounts to 90° to 210°.

7. The device as claimed in claim 6, characterized in that the loop-around of the control roller (20) amounts to 150° to 180°.

8. The device as claimed in claim 3, characterized in that the gear is a spline gear (34).

9. A device for regulating the linear stability of a revolving belt (10) of a transport installation including a control roller (20) which is arranged transversely to a belt running direction and is pressed against the belt (10) and which can be deflected by means of an actuating drive cooperating with a sensor (24) detecting a lateral position of the belt (10), in order, in the event of a lateral drift of the belt (10), to deflect the control roller (20) for the purpose of aligning the belt, the control roller (20) being mounted on an axle (21) which is mounted pivotably in the region of a first edge (11a) of the belt (10) and which is connected and displaceably guided at its second end in the region of a second edge (11b) of the belt (10) by guidance and adjustment means, characterized in that the control roller (20) is arranged on the inside of the belt (10) in a belt loop (22) lying essentially perpendicularly to a transport plane and having high loop-around and is pivotable essentially perpendicularly to the transport plane, characterized in that the loop-around of the control roller (20) amounts to 150° to 180°.

10. The device as claimed in claim 9, characterized in that the control roller (20) serves at the same time as a drive roller.

11. The device as claimed in claim 9, characterized in that, to demount the belt (10), the rocker (26) is displaced away from the control roller (20) in an axial direction parallel to an axis (21) of the control roller (20) and the control roller (20) is consequently pivoted away.

12. The device as claimed in claim 9, characterized in that the rocker (26) is mounted laterally in a long hole (46) of lateral mountings (50).

13. The device as claimed in claim 9, characterized in that a regulating device with sensors (24, 28) is provided for detecting the position of the belt (10) and the location of the control roller (20) for regulation about a position or location desired value of the belt (10) and of the control roller (20).

* * * * *